United States Patent

[11] 3,616,937

| [72] | Inventors | William L. Frame<br>Route 2, Box 412, Texarkana, Tex. 75501;<br>Robert D. Renfrow, Lockesburg, Ark.<br>71846 |
|---|---|---|
| [21] | Appl. No. | 869,669 |
| [22] | Filed | Oct. 27, 1969 |
| [45] | Patented | Nov. 2, 1971 |

[54] STACKABLE STORAGE RACKS
10 Claims, 6 Drawing Figs.

| [52] | U.S. Cl. | 211/24 |
| [51] | Int. Cl. | A47f 7/04 |
| [50] | Field of Search | 211/23, 24, 177, 13, 41; 214/10.5 |

[56] References Cited
UNITED STATES PATENTS

| 1,380,802 | 6/1921 | House | 211/23 |
| 1,438,729 | 12/1922 | Vance | 211/23 |
| 1,410,740 | 3/1922 | Elgin | 211/23 |
| 2,262,794 | 11/1941 | Burbank | 211/23 X |
| 3,348,698 | 10/1967 | McConnell | 211/24 |
| 3,502,227 | 3/1970 | Konstant | 211/177 |

*Primary Examiner*—Nile C. Byers, Jr.
*Attorney*—Shanley and O'Neil

ABSTRACT: Stackable storage racks in which each rack includes a base section and two detachable, cantilever-mounted upright sections. When disassembled from the upright sections, the base sections can be stacked upon one another for compact shipping. The upright sections are assembled with the base section by telescopically inserting columns of the upright sections into support tubes of the base section. The racks are stacked upon one another and interact to form a stable, tiered structure. When the racks are stacked, the base section of each rack provides a stiffening action between the upright sections of the subjacent rack.

INVENTORS
WILLIAM L. FRAME
ROBERT D. RENFROW

BY Shanley & O'neil

ATTORNEYS

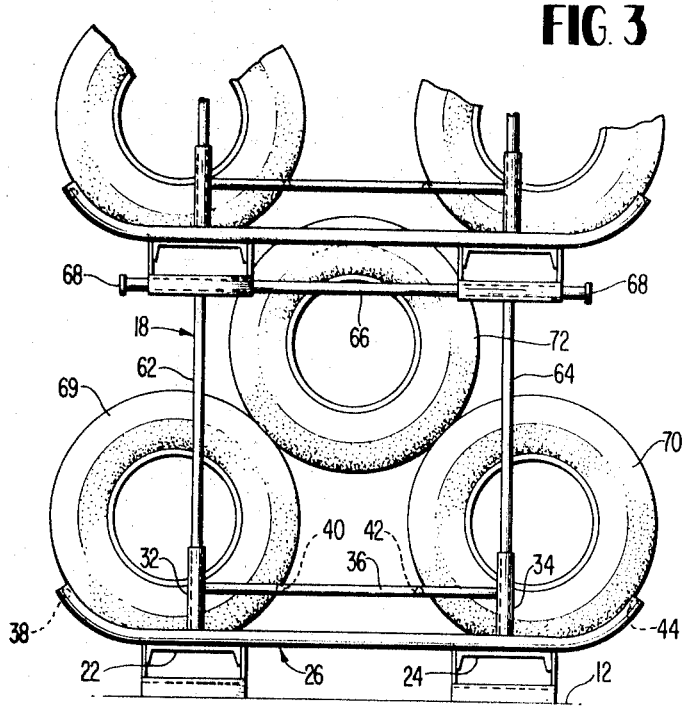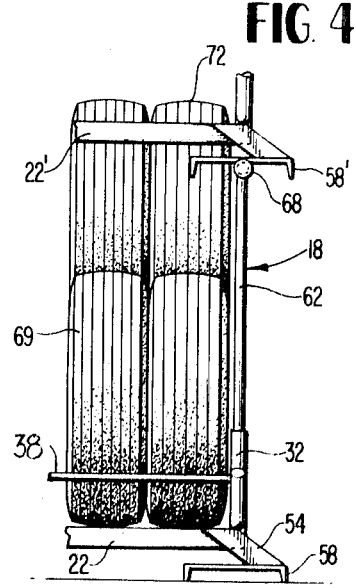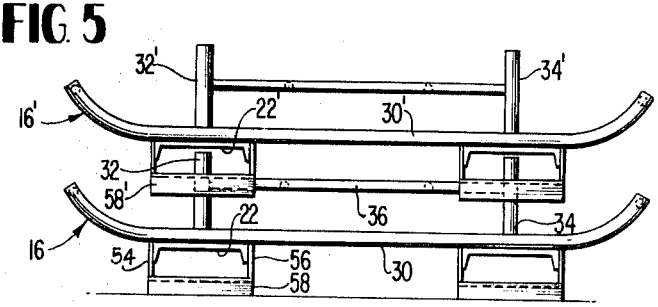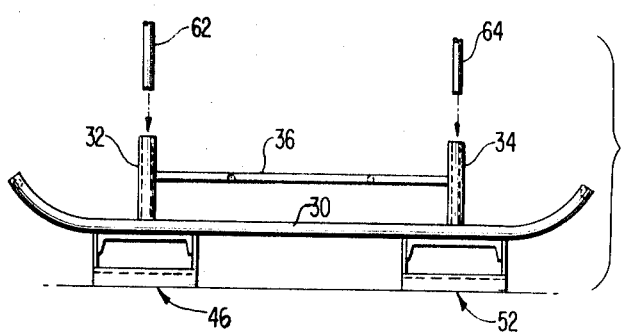
FIG. 3
FIG. 4
FIG. 5
FIG. 6
INVENTORS
WILLIAM L. FRAME
ROBERT D. RENFROW
BY Shanley & O'Neil
ATTORNEYS

STACKABLE STORAGE RACKS

BACKGROUND OF THE INVENTION

This invention relates to stackable storage racks, and more particularly to stackable racks for storing vehicle tires.

For vendors and others having substantial inventories of vehicle tires, it is desirable that the tires be stored in upright position. With the tires arranged in this way, random access can be had to the tires so that tires having a particular size, style or other distinguishing characteristic can be selected and removed without disturbing the remaining tires. Often the floor area available for tire storage is limited, as are funds for purchase of storage structures. Numerous prior art structures have been proposed for storing tires, but such constructions have had some disadvantage or deficiency which prevented their being entirely satisfactory.

Accordingly, a main object of the invention is the provision of improved tire storage racks which are stackable, which interact to form a stable tiered structure when stacked, which can be compactly shipped but quickly and easily erected, and which are roomy, lightweight, easy and economical to fabricate and rugged and durable in use.

Other objects of the invention will appear from the following detailed description which, in connection with the accompanying drawings, discloses a preferred embodiment of the invention for purposes of illustration only and not for determination of the limits of the invention. For definition of the scope of the invention, reference will be made to the appended claims.

BRIEF DESCRIPTION OF THE DRAWINGS

FIG. 3 is an end elevational view of the racks of FIG. 1.

FIG. 4 is a side view of details of the structure of FIG. 1.

FIG. 5 is an end elevational view of the stacked base sections of FIG. 2.

FIG. 6 schematically illustrates the manner in which the racks of FIG. 1 are erected.

Figure 1:
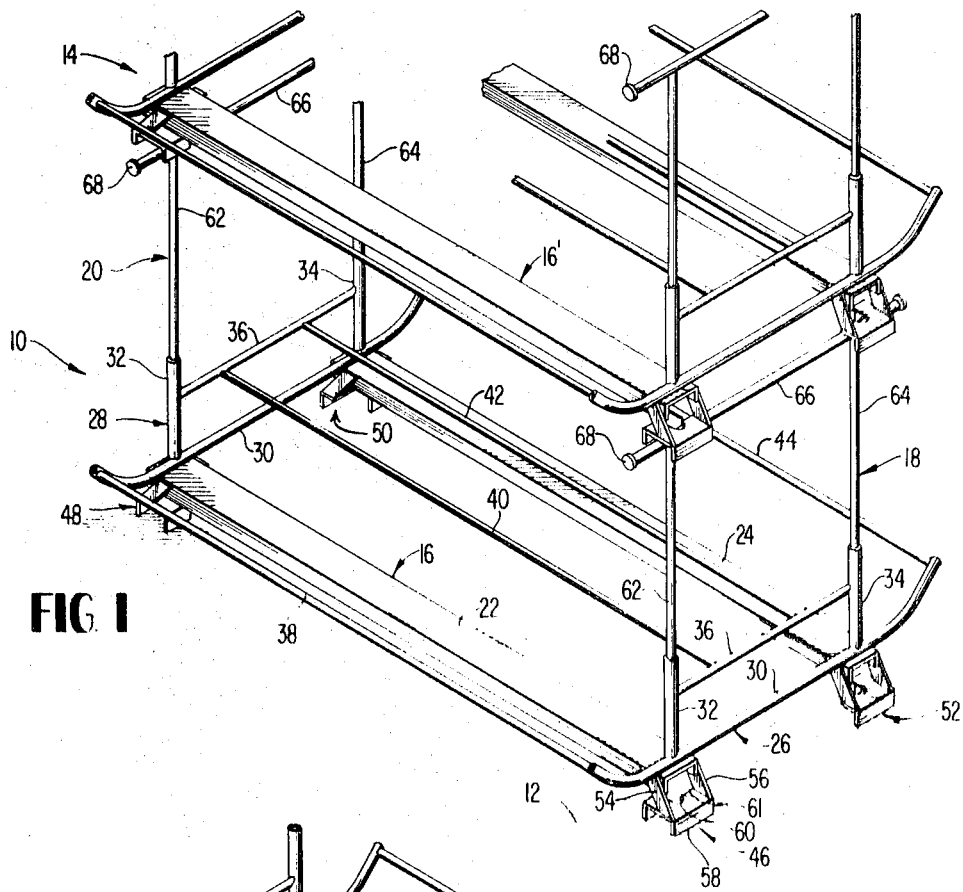
FIG. 1 is an isometric view of two stacked tire storage racks embodying principles of the invention.

Primed reference characters denote elements corresponding to the elements indicated with the unprimed characters.

DESCRIPTION OF THE PREFERRED EMBODIMENT

In FIG. 1 a tire storage rack embodying principles of the invention is generally indicated at 10 and rests on a floor 12. Another rack generally indicated at 14 is stacked on rack 10. Racks 10 and 14 are identical, so description of one imparts an understanding of both.

Rack 10 includes a base section 16 and two upright sections 18, 20 which project upwardly from opposite end portions of base section 16. Base section 16 includes two parallel, spaced-apart base members or channels 22, 24. Each channel has its web uppermost and its flanges extending downwardly.

Two end frame members 26, 28 are respectively rigidly joined to the opposite ends of base channels 22, 24 to define a rigid framework rectangular in plan view. Each frame member includes a transverse structural member 30 which is welded to the base channels. Member 30 has opposite free end portions which are curved upwardly for a purpose to be described.

In each frame member, two parallel, spaced-apart, upstanding support members or tubes 32, 34 are rigidly secured to transverse member 30. The support tubes project upwardly from transverse member 30, and each tube is oriented over the end portion of a base channel. The support tubes are rigidly interjoined by a strut 36. The open cross sections of the support tubes form upwardly opening recesses having a purpose to be described.

Four tire-support rails 38, 40, 42, 44 extend parallel to the base channels, and are rigidly connected at their opposite ends to frame members 26, 28. The rails are arranged in pairs, with the rails of each pair being respectively disposed on opposite sides of a base channel. For example, rail 38 is on one side of base channel 22, and rail 40 is on the opposite side of channel 22. Outboard rails 38, 44 are joined to transverse members 30 at the upcurved end portions of the transverse members, and inboard rails 40, 42 are joined to the struts 36 which interconnect the support tubes of frame members 26, 28.

With this arrangement of the tire-support rails, the rails are spaced above the base channels, stiffening frame members 26, 28 and providing a rigid cantilever mounting for the frame members and, through the frame members, for upright sections 18, 20. The spacing of the rails of each pair from one another and above the respective base channel permits enough of the periphery of a tire to pass between the rails that the tire is supported against rolling out of the rack (see FIG. 3).

Rack 10 includes four supporting legs 46, 48, 50 and 52 (FIG. 1). Each leg extends downwardly from one end of a base channel, and is similar to the other legs, so description of one imparts an understanding of all.

Leg 46 includes a pair of opposed, downwardly projecting braces 54, 56 which are welded to the flanges of base channel 22. A foot channel 58 is welded to the braces and spaced below base channel 22. Foot channel 58 is transverse to base channel 22, and has its web uppermost and its flanges projecting downwardly to define a downwardly opening recess having a purpose to be described.

An aperture 60 is formed in the central portion of the web of foot channel 58 at a location aligned with overhead support tube 32. Aperture 60 receives the upper end portion of a support tube of a subjacent rack when base sections are stacked upon one another for compact shipping, see FIGS. 2, 5. In these figures, base section 16' is shown stacked upon base section 16, and the upstanding support tubes of frame members 26, 28 of base section 16 are received in the foot channels of base section 16'. For example, support tube 32 of end frame 26 of base section 16 passes through aperture 60' in foot channel 58' of base section 16'. The upper end of support tube 32 bears against the underside of the web of base channel 22' at a location aligned with overhead support tube 32'. More base sections can be stacked upon base section 16' and the interaction between vertically adjacent base sections will be as described in the foregoing.

The inboard, facially opposing corners of the foot channels are cut away, as at 61. The remaining portions of the channels form a physical barrier to lateral displacement of the support tubes, to prevent movement of the base sections relative to one another in a direction transverse to or along the base channels and provide a laterally rigid, compact stack. The walls of aperture 60 conform to the configuration of the received support tube but a slight clearance is provided therebetween for insertion of the tube into the aperture.

Each of the upright sections 18, 20 (FIG. 1) includes two parallel, upstanding columns 62, 64 which are spaced apart a distance corresponding to the spacing of support tubes 32, 34 of frame members 26, 28. By this arrangement, the columns of the upright sections register with the support tubes for detachably mounting the upright sections in the support tubes.

Each column includes a lower end portion which is telescopically received in the recess formed by the open cross section of the registered support tube (see FIGS. 1, 3, 6). The lower end of the column seats on transverse member 30 at the bottom of the tube. The column e.g. can be a pipe having a nominal diameter of 1 inch. Such a pipe, when used with a support tube of 1¼ inch nominal diameter, provides a slight clearance between the outside walls of the column and the inside walls of the tube for easily inserting the column into the tube, but minimizes side-to-side weaving movement of the upright section to produce a rigid structure when the racks are stacked upon one another. With pipes of such exemplary diameter, the telescoping reception of about 9 inches of column into a support tube is adequate to provide a rigid structure.

Each upright section 18, 20 includes a free upper end portion spaced above the tire support rails, by virtue of the cantilever mounting of the upright sections through the support arrangement of the frame members and the telescopic mounting of the columns in the support tubes of the frame members. The cantilever construction of the upright sections is advantageous in maximizing the overhead room for insertion and removal of tires in a direction transverse to the base channels. When the racks are stacked, the base channels of the upper rack provide a stiffening action between the upright sections of the subjacent rack, which is desirable to reduce weaving in the stack of racks. However, the base channels of the upper racks are spaced above the tops of the upright sections of the lower rack by essentially the entire length of the legs of the upper rack to maximize overhead space for insertion and removal of tires in the lower rack.

In each upright section 18, 20, the upper end portions of columns 62, 64 carry and are rigidly interjoined by a transverse support pipe 66 having opposite ends projecting beyond the columns and terminating in radially outwardly projecting flanges or caps 68. For stacking the racks, the recesses in the two foot channels at each end of the upper rack receive the transverse support pipe of one of the upright sections of the subjacent rack. The downwardly projecting flanges of the foot channels act against support pipe 66 to restrain displacement of the rack relative to the subjacent rack in a direction along the base channels. Radially outwardly projecting flanges 68 restrain displacement in a direction along transverse support pipe 66. Normally, the weight of the upper rack with its load of tires prevents any movement of the rack relative to the subjacent rack but, should abnormal sidewise thrust be applied to the stacked racks, the foot channel flanges and radial flanges 68 stop any sliding movement of one rack upon another after limited displacement. Yet, the foot channel construction provides adequate support area for a rack on a floor or on another rack. If desired, the distance between flanges of each foot channel can be no more than required for clearance to insert pipe 66 into the recess in the channel, so that substantially no movement of the upper rack relative to the lower rack in a direction along the base channels is possible. Similarly, the length of support pipe 66 can correspond to the distance between the outboard edges of the foot channels, so that radial flanges 68 abut the foot channels to prevent substantially all movement along pipe 66.

Figure 2:
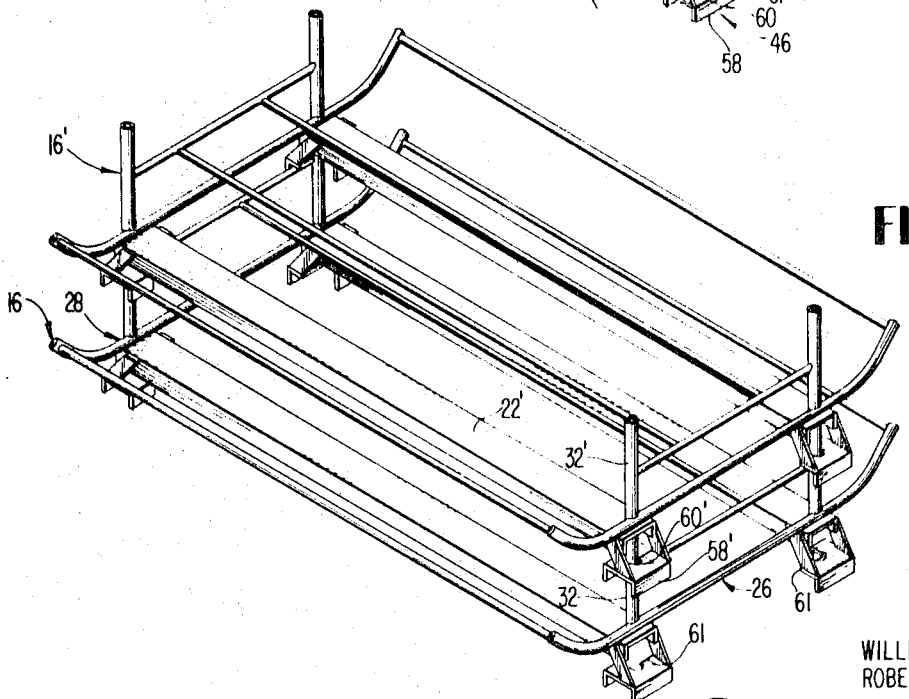
FIG. 2 is an isometric view of stacked base sections of the racks of FIG. 1.

In use, the base section and upright sections are individually fabricated, and the base sections are stacked in the manner indicated in FIGS. 2 and 5 for compact shipping. The racks are shipped to the customer, who destacks the base sections, telescopically inserts the columns of two upright sections in the support tubes of a base section (FIG. 6) and a rack is ready to be loaded with three rows of tires (FIG. 3). One row 69 of tires is supported between tire support rails 38, 40 and upon base channel 22, and another row 70 of tires is carried between support rails 42, 44 on base channel 24. By this arrangement, much of the weight of each row of tires is carried directly by a base channel, and the tire support rails can be of light construction.

Tire rows 69, 70 are spaced apart so that a third row 72 of tires can be supported on rows 69 and 70, and the weight of row 72 is transmitted through the lower rows of tires to the base channels and to the tire support rails. The reception of third row 72 between the tires of the lower rows prevents the tires of the third row from rolling out of the rack. The upright sections 18, 20 provide support for the ends of the rows of tires to keep them in an upstanding position. The tires of third row 72 can closely abut the upright sections (FIG. 4) without danger of interfering with placement of a second rack on the first rack because the cutaway inboard corners of the foot channels of each rack make room for the tires of a third row in any subjacent rack.

The upright sections of a second rack are mounted in the support tubes of another base section, and the second rack is loaded with tires and placed upon the first rack by a forklift, crane or other suitable powered lifting mechanism. The second rack is mounted on the first rack with the foot channels of the upper base section receiving the support pipes 66 of the lower rack in the manner illustrated in FIGS. 1 and 3.

The process of rack assembly, loading and stacking is repeated until as many racks as needed or as permitted by overhead room are stacked upon one another. Because of the telescoping arrangement for mounting the uprights on the base section, erection of each rack is quick and simple. If desired, bolts can be inserted through aligned holes in each support tube and the received portion of the column, to prevent extraction of the column from the support tube. Because of the interlocking construction of the racks, their stacking is easily and accurately effected.

The telescoping arrangement of columns and support tubes minimizes weaving of the racks even when the racks are stacked as many as four or five high or more. The base channels of each rack coact with the cantilever construction of the upright sections of the subjacent rack to impart stiffening action between the upright sections of the subjacent rack while maximizing access room to the subjacent rack.

It will be appreciated that, if desired, the racks can be loaded with the tires after the stack of racks has been constructed, or each rack can be loaded after it has been placed in its position in the stack. Because the racks are of lightweight construction, no powered lifting device is necessary to mount unloaded racks upon one another.

It will also be appreciated that any rack can, if desired, be transported with its load of tires from place to place by a forklift, crane or the like.

Tire storage racks according to the invention are highly advantageous. The racks are easily stackable, and interact to form a stable structure when stacked. The racks are collapsible for compact shipping and handling but can be quickly and easily erected. Head room for access to individual racks is maximized. The racks are formed from inexpensive, lightweight materials such as metal tubing and channel sections, but are sturdy and withstand severe service usage.

We claim:

1. An article storage rack, comprising
a base section, and
a plurality of spaced-apart upright sections associated with the base section,
the base section including
a plurality of spaced-apart, rigidly interjoined frame members, and
article-supporting means associated with the frame members,
each frame member including a plurality of spaced-apart upstanding support members,
each upright section including a plurality of columns,
each column being registered with a support member,
each column and registered support member including detachable, cooperating, first mounting means for detachably mounting the column on the support member,
the base section including a plurality of downwardly projecting legs,
each support member including an upper portion,
each leg including second mounting means for cooperating with the upper portion of a support member of a second base section for stacking the first-named base section upon the second base section,
each upright section including an upper portion,
each leg also including third mounting means for cooperating with the upper portion of an upright section of a second rack for stacking the first-named rack upon the second rack.

2. The structure of claim 1,
each column and registered support member being in telescoping interrelationship.

3. The structure of claim 1,
the detachable, cooperating first mounting means including a lower end portion of the column, and means defining an upwardly open recess in the support member for telescopically receiving the lower end portion of the column.

4. The structure of claim 1,
the second mounting means including means defining an aperture aligned with a support member of the first-named base section for receiving the upper portion of the cooperating support member of the second base section.

5. The structure of claim 4,
each leg including downwardly projecting brace means, and
a foot member rigidly associated with the brace means,
the aperture being formed in the foot member.

6. The structure of claim 4,
each column including an upper end portion,
each upright section including support means carried by the upper portions of the columns,
the third mounting means including
means defining a downwardly opening recess for receiving a support means of the second rack, and
means for restraining displacement of the leg member relative to the support means of the second rack.

7. An article storage rack, comprising
a base section, and
a plurality of spaced-apart upright sections associated with the base section,
the base section including
a plurality of spaced-apart, rigidly interjoined frame members, and
article-supporting means associated with the frame members,
each frame member including a plurality of spaced-apart upstanding support members,
each upright section including a plurality of columns,
each column being registered with a support member,
each column and registered support member including cooperating means for detachably mounting the column on the support member,
the base section including
a pair of spaced-apart base members rigidly interjoining the frame members,
the article-supporting means including an article-supporting rail disposed on each side of each base member and spaced above the base members,
each upright section having a free upper end portion spaced above the article-supporting rails.

8. A tire storage rack, comprising
a base section, and
a pair of upright sections projecting upwardly from opposite end portions of the base section,
the base section including
a frame member located at each end portion of the base section,
a pair of generally parallel, spaced-apart base members rigidly associated with the frame members and extending between the frame members and having opposite end portions,
each frame member including
a plurality of spaced-apart upstanding support members,
each support member including an upper end portion, and
means defining an upwardly opening recess in the support member,
a tire-supporting rail rigidly associated with the frame members above the base members and extending between the frame members on each side of each base member, and
a leg rigidly associated with each end portion of each base member,
each leg being aligned with a support member and including a foot member spaced below the base member,
the foot member including means defining an aperture aligned with the support member above for receiving the upper end portion of a support member of a second base section for stacking the first-named base section upon the second base section,
each upright section including
a free upper end portion spaced above the tire-supporting rails,
a plurality of columns,
each column including
a lower end portion telescopically received in a recess in a support member, and
an upper end portion, and
support means rigidly interjoining the free upper end portions of the columns,
each foot member including
means defining a downwardly opening recess for receiving a support means of a second rack for stacking the first-named rack upon the second rack, and
means for restraining displacement of the foot member relative to the support means of the second rack.

9. An article storage rack, comprising
a base section, and
a plurality of spaced-apart upright sections associated with the base section and having free upper end portions,
the base section including
a pair of spaced-apart frame members,
a pair of spaced-apart base members rigidly interjoining the frame members,
a bottom portion, and
article-supporting means interjoining the frame members at a location above the base members and below the free upper end portions of the upright sections,
the bottom portion of the base section including
mounting means for mounting the rack upon the free upper end portions of the upright sections of a second rack, and
restraining means for restraining displacement of the first-named rack relative to the free upper end portions of the upright sections of the second rack,
the base members of the first-named rack providing a stiffening action between the free upper end portions of the upright sections of the second rack.

10. The structure of claim 9,
the mounting means including
means defining downwardly opening recesses in the base section for receiving the free upper end portions of the upright sections of the second rack.